United States Patent Office 3,661,807
Patented May 9, 1972

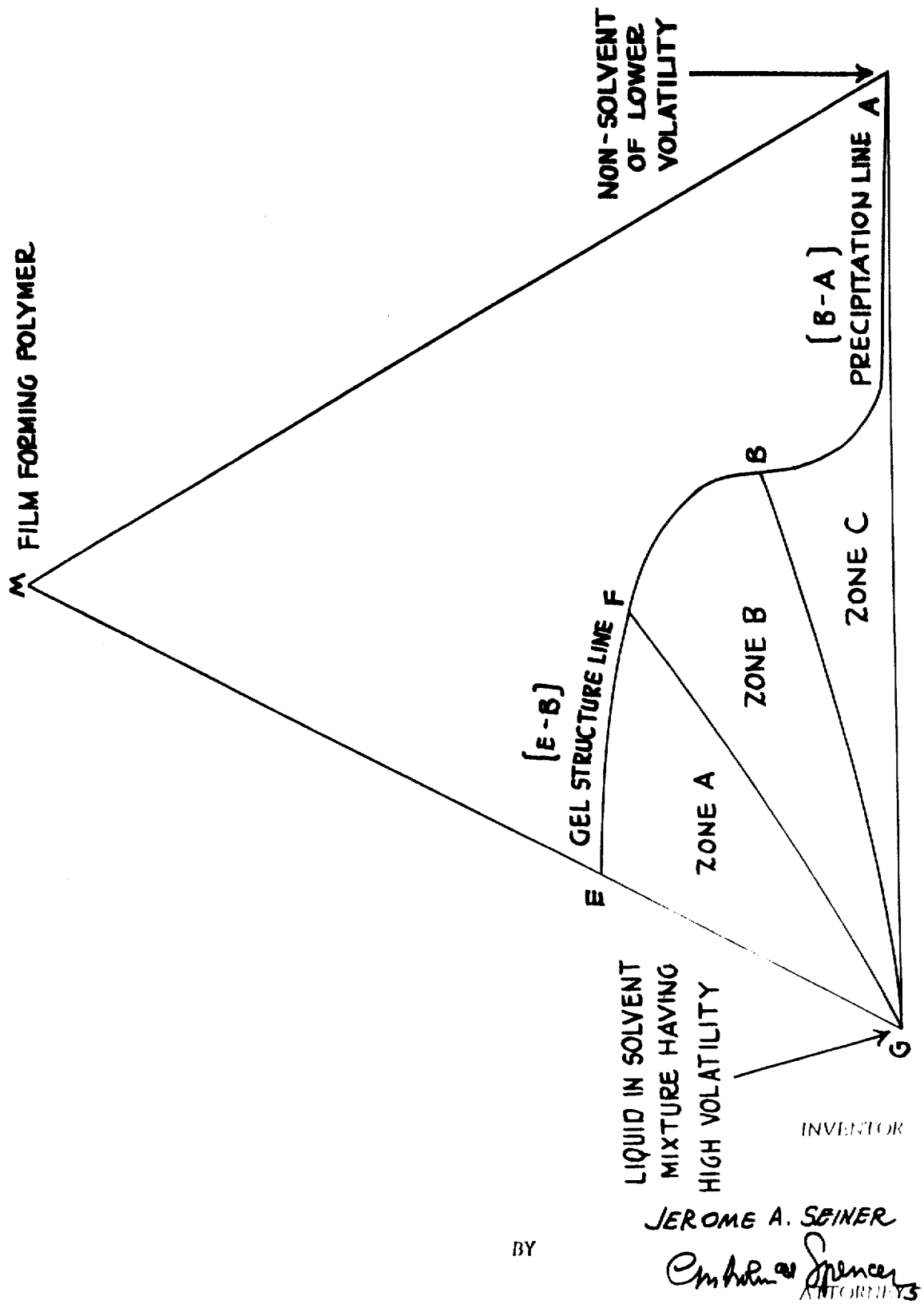

3,661,807
SOLUBLE FLUORESCENT MATERIALS AND OPTICAL BRIGHTENERS IN SOLVENT PRECIPITATION FILM COMPOSITIONS
Jerome A. Seiner, Pittsburgh, Pa., assignor to PPG Industries, Inc., Pittsburgh, Pa.
Continuation-in-part of application Ser. No. 4,175, Jan. 14, 1970, which is a continuation of application Ser. No. 524,953, Feb. 1, 1966. This application Apr. 15, 1970, Ser. No. 28,734
Int. Cl. C08 1/26
U.S. Cl. 260—2.5 M          25 Claims

ABSTRACT OF THE DISCLOSURE

The disclosed invention relates to opaque films with enhanced optical properties produced by the inclusion of soluble fluorescent materials and optical brighteners in the opaque films in such a manner as to maximize their effectiveness therein. The films of this invention, absent the above described additives, are non-porous, microcellular and opaque in and of themselves. Therefore, lesser amounts of the additives are necessary to obtain desired optical properties. The preparation of the films of the disclosed invention involves the mixing of a film forming polymer with a solvent mixture for the film forming polymer, whereby the solvent mixture comprises at least two miscible liquids, at least one of the liquids being a nonsolvent for the polymer and having a lower volatility than that of the other liquids in the mixture and a flourescent material or an optical brightener which is soluble in said composition. The polymer solvent mixture is then applied to a substrate and the solvent mixture is removed as by evaporation. During the removal, a gelled film having entrapped therein the low volatility non-solvent is first formed and upon further evaporation, the non-solvent is removed, leaving behind small closed voids in its place. These voids cause the film to be opaque.

The added ingredients are included by dissolving them in the solvent mixture of the above-described process prior to the removal of the solvent mixture from the composition.

This application is a continuation-in-part of my copending application, Ser. No. 4,175, filed Jan. 14, 1970, which is a continuation application of Ser. No. 524,953, filed Feb. 1, 1966, now abandoned.

BACKGROUND OF THE INVENTION

Opaque films are conventionally prepared by adding a pigment which acts as an opacifying agent to a solution of a film forming material which would otherwise be colorless or transparent when cast in a film. The necessity for adding a large amount of an opacifying agent obviously increases the cost of the resultant film. Moreover, such films have no more porosity than the non-pigmented film.

Optical opacity, for example hiding in a paint film, is achieved either by absorption of the incident light or by scattering of the incident light, or a combination of these two. Thus, black is opaque because it absorbs the light incident on it and white is opaque because it back-scatters the incident light. Light is either absorbed or scattered before it can reach the substrate. The ideal white pigment then is one which has zero absorption and maximum scattering.

Absorption depends primarily on the electronic structure of the molecule, as well as on the pigment particle size relative to the wavelength of light. Scattering depends on the relative refractive indices of pigment and vehicle as well as on the particle size of the pigment relative to the wavelength of incident light.

One simple description of the relation of the scattering and absorption to the resulting reflectance is that of Kubelka and Munk. At complete hiding, the following equation applies:

$$\frac{(1-R\infty)^2}{2R\infty}=\frac{K}{S} \quad \text{(Equation 1)}$$

where $R\infty$ is reflectance of a film so thick that a further increase in thickness does not change the reflectance, K is the absorption coefficient and S is the Kubelka-Munk scattering coefficient. No account is taken of the surface reflectances, and the equation applies only to internal reflectance.

The fractions contributed by more than one pigment in a system are additive as shown by the following equation:

$$\frac{(1-R\infty)^2}{2R\infty}=\frac{C_1K_1+C_2K_2+C_3K_3+\ldots}{C_1S_1+C_2S_2+C_3S_3+\ldots}$$

(Equation 2)

wherein $C_1$, $C_2$ and $C_3$ refer to the concentration of pigments 1, 2, 3, etc.

When hiding is incomplete, the following equation applies:

$$R=\frac{1-Rg\,(a-b\,\text{ctgh}\,bSX)}{a-Rg+b\,\text{ctgh}\,bSX} \quad \text{(Equation 3)}$$

where R is the resulting internal reflectance, $Rg$ is the reflectance of the substrate, $a$ is equal to $$(S+K)/S, b=(a^2-1)^{1/2}$$

S is the scattering coefficient, X is the thickness of the film in mils, and ctgh refers to hyperbolic contangent.

The Kukelka-Munk scattering coefficient may be computed from the following equation:

$$SX=\frac{1}{b}\,Ar\,\text{ctgh}\,\frac{1-aRo}{bRo} \quad \text{(Equation 4)}$$

where $Ar$ ctgh refers to the inverse hyperbolic contangent, $Ro$ is the reflectance over a black substrate of 0% reflectance, $a$ may be found from the relation, $$a=\frac{1}{2}\left[R+\frac{Ro-R+Rg}{RoSg}\right]$$

and $b$ is determined as above. In this equation, R equals reflectance over a white substrate and $Rg$ is reflectance of the substrate which is coated; or $a$ may be found from the following equation:

$$a=\frac{1}{2}\left[\frac{1}{R\infty}+R\infty\right]$$

K may be found from the equation $K=S(a-1)$.

The Kubelka-Munk analysis is discussed in further detail by D. B. Judd in "Color in Business, Science and Industry," John Wiley and Sons, New York, 1952, pp. 314–338; and by D. B. Judd and G. Wyszecki in "Color in Business, Science and Industry," 2nd Edition, John Wiley and Sons, New York, 1963, pp. 387–413, the disclosures of which are incorporated herein by reference.

Various processes have been described in the art for preparing opaque films which rely for opacity upon the presence of large number of voids in the films. Such films may be prepared by depositing a film from an emulsion, i.e., either an oil-in-water or a water-in-oil emulsion. When a water-in-oil emulsion is used—i.e., one in which minute droplets of water are dispersed in a continuous phase of a film forming material—the emulsion is deposited as a coating and the organic solvent which comprised the continuous phase of the emulsion is evaporated therefrom. This causes gelation of the film forming material and entrapment of the dispersed water droplets. The water is then evaporated leaving microscopic voids throughout the film structure.

When an oil-in-water emulsion is used, the mechanism for forming the film is similar to that described above. A film forming material is dissolved in water. Thereafter, an organic liquid which is a non-solvent for the film former and which is not miscible with water is emulsified in the aqueous phase. The emulsion is cast as a film and the water is evaporated causing the film forming material to gel and entrap minute droplets of the organic liquid. This liquid is then evaporated to cause minute voids in the film structure.

Another technique for obtaining porous, opaque, non-pigmented films is by preparing an aqueous dispersion of a film forming polymer containing a water soluble organic solvent in an amount which is insufficient to dissolve the polymer. This aqueous dispersion is then cast as a film and water is evaporated causing entrapment of minute droplets of the organic solvent in the polymer. The film is then washed to dissolve the entrapped minute droplets of solvent and the film is dried.

However, the use of emulsions presents certain problems, by virtue of the very nature of an emulsion. For example, in handling an emulsion, care must be taken in order to insure its stability—i.e., so that it will not break before it is used to deposit a film. This frequently requires the use of emulsifying agents. However, emulsifying agents which are then present in the film detract from the physical properties of the film such as its water repellency, scrub resistance, etc. Furthermore, only film forming materials which are capable of being readily emulsified may be employed in such a system. Moreover, when films are formed from emulsions, the size of the voids present in the film are dependent upon the size of the droplets in the emulsion which are entrapped in the film. This places a definite limitation upon the smallness of the voids which are obtained in the film.

Still another technique for obtaining an opaque, non-pigmented film is set forth in U.S. Pat. No. 3,031,328. Basically, this process contemplates preparing a solution of a thermoplastic polymer material in a mixture of a volatile organic solvent and a volatile non-solvent liquid which has an evaporation rate substantially less than that of the solvent. The clear homogenous solution is then coated on a suitable backing material and dried by evaporation to produce an opaque blushed film which is adapted to be rendered locally transparent by heat or pressure.

However, the use of the thermoplastics which will become transparent upon the application of heat or pressure would not be suitable for most industrial and household uses as coatings. On the other hand, the use of either a durable plastic or one which contains a soluble fluorescent material or optical brighteners in the polymer matrix would not be practicable for a coating which is desirous to become transparents upon the application of heat or pressure.

SUMMARY OF THE INVENTION

This invention relates to non-porous microcellular opaque films which contain within their cellular structure soluble, fluorescent materials and/or optical brighteners in such a manner as to optimize the effects of these materials in the films, and to coating compositions for use in preparing such films.

Basically, this invention provides such films by a process which comprises preparing a composition comprising a film forming gelable polymer or mixtures thereof, and a solvent mixture for said film forming material, and having dissolved therein fluorescent materials and/or optical brighteners which are soluble in the polymer-solvent mixture.

The preferred method for preparing the non-porous, microcellular opaque films in which the additives are incorporated in accordance with the practice of this invention is described in my copending parent application Ser. No. 4.175, filed Jan. 14, 1970 which is a continuation of application Ser. No. 524,953, filed Feb. 1, 1966, now abandoned. The film forming, gelable polymer is mixed with a solvent mixture comprising at least two miscible liquids, at least one of said liquids being a non-solvent for said polymer and having a lower volatility than that of the other liquids in said mixture. The amount of said lower volatility non-solvent liquid present in said mixture being at least enough to produce, upon removal of said mixture from said composition in the absence of an opacifying agent, a film having a Kubelka-Munk scattering coefficient greater than 0.5 reciprocal mil at 4400 angstroms and greater than 0.1 reciprocal mil at 5600 angstroms, and less than that which, upon the removal of said solvent mixture from said composition, produces a discontinuous film having interconnected voids, and (b) removing the solvent mixture from the composition applied to said substrate.

Various film forming gelable polymers may be used in the practice of this invention with the only limitation that they must be soluble in (i.e., miscible with) the particular solvent mixture used and they must be capable of gelling (i.e., being transformed from the liquid phase to the solid phase) upon evaporation of a portion of the solvent system.

The film forming, gelable polymers which may be used in the practice of this invention are well known in the art. These include various types of polymers such as thermoplastic and thermosetting synthetic and natural polymers. Thermoplastic synthetic and natural polymers may be used, although thermosetting polymers are the preferred resins since they are resistant to heat and are extremely durable and abrasion resistant.

The thermosetting resins which may be used in the practice of this invention are well known in the art. Such resins are curable to cross linked thermoset condition by the use of either heat and/or curing agent as well as by other methods, such as radiation.

Among the various thermosetting resins which can be employed in the organic coating compositions are: admixtures of interpolymers of hydroxyl esters of ethylenically unsautrated acids with at least one other polymerizable ethylenically unsaturated monomer; admixtures of alkyd resins; aldehyde modified interpolymers of ethylenically unsaturated carboxylic acid amides with at least one other polymerizable ethylenically unsaturated monomer; polyepoxy resins; aminoplast resins and mixtures of two or more of these. A more detailed description of these resins as contemplated by this invention is found hereinbelow:

Admixtures of interpolymers of hydroxyl esters of ethylenically unsaturated acids with at least one other polymerizable ethylenically unsaturated monomer This group includes interpolymers of hydroxyl esters of unsaturated acids with at least one other polymerizable ethylenically unsaturated monomer which are prepared by interpolymerizing a mixture of monomers comprising from about 2 to about 50 percent by weight of a hydroxyalkyl ester of an ethylenically unsaturated carboxylic acid and at least one other ethylenically unsaturated monomer copolymerizable therewith. In many cases, more than one hydroxyalkyl ester is included in the interpolymer, and generally several monomers in addition to the hydroxyalkyl ester or esters are employed. These interpolymers are produced in a manner well known in the art, using conventional procedures utilizing catalysts well known in the art. Free radical producing catalysts are commonly used but catalyst systems which function through other mechanisms can also be employed. The conditions of time, temperature and the like at which these interpolymerizations are carried out are also conventional and depend in large part upon the particular catalyst employed.

Preferred monomer systems used to produce these interpolymers are those containing hydroxyalkyl esters in which the alkyl group has up to about 12 carbon atoms. Especially preferred esters are acrylic acid and methacrylic acid esters of glycol and 1,2-propylene glycol, i.e., hydroxyethyl acrylate and methacrylate. Combinations of these esters are also widely used. However, there may also be employed similar esters of other unsaturated acids, for example, ethacrylic acid, crotonic acid, and similar acids having up to about 6 carbon atoms, as well as esters containing other hydroxyalkyl radicals, such as hydroxybutyl esters and hydroxylauryl esters.

In addition to esters of unsaturated monocarboxylic acids, there may be employed the mono- or diesters of unsaturated dicarboxylic acids, such as maleic acid, fumaric acid and itaconic acid, in which at least one of the esterifying groups is hydroxyalkyl. Such esters include bis(hydroxyethyl) maleate, bis(hydroxypropyl) fumarate, and similar bis(hydroxyalkyl) esters, as well as mixed alkyl hydroxyalkyl esters, such as butyl hydroxyethyl maleate and benzyl hydroxypropyl maleate. Monoesters such as mono(hydroxyethyl) and mono(hydroxypropyl) esters of maleic acid and similar acids can also be used.

The monomer or monomers with which the hydroxyalkyl ester is interpolymerized can be any ethylenic compound copolymerizable with the ester, the polymerization taking place through the ethylenically unsaturated linkages. These include monoolefinic and diolefinic hydrocarbons halogenated monoolefinic and diolefinic hydrocarbons, unsaturated esters of organic and inorganic acids, esters of unsaturated acids, nitriles, unsaturated acids, and the like. Examples of such monomers include styrene, 1,3-butadiene, 2-chlorobutene, alpha-methylstyrene, alpha-chlorostyrene, 2-chloro-1, 3-butadiene, 1,1-dichloroethylene, vinyl butyrate, vinyl acetate, allyl chloride, dimethyl maleate, divinylbenzene, diallylitaconate, triallyl cyanurate, and the like.

The most useful interpolymers of this type are produced from the interpolymerization of one or more hydroxyalkyl esters with one or more alkyl esters of ethylenically unsaturated carboxylic acids or a vinyl aromatic hydrocarbon, or both. Among these preferred comonomers are the methyl, ethyl, propyl, butyl, hexyl, and lauryl acrylates and methacrylates as well as similar esters having up to about 20 carbon atoms in the alkyl group. Among the vinyl aromatic hydrocarbons generally utilized are styrene and alpha-alkylstyrene or vinyltoluene. The preferred monomer systems may include an ethylenically unsaturated nitrile, such as acrylonitrile, or methacrylonitrile, and in many instances an ethylenically unsaturated carboxylic acid is present, of which the preferred are acrylic acid and methacrylic acid. The specific comonomers most often employed are methyl methacrylate, ethyl acrylate, styrene, vinyltoluene, acrylonitrile, methacrylonitrile, methacrylic acid, acrylic acid 2-ethylhexyl acrylate, butyl acrylate, butyl methacrylate, and lauryl methacrylate.

Examples of catalysts ordinarily used in the interpolymerization include peroxygen compounds such as benzoyl peroxide, cumene hydroperoxide, hydrogen peroxide, and t-butylperoxy isopropyl carbonate, and azo compounds such as alpha, alpha-azobis(isobutyronitile) and p-methoxyphenyl diazothio (2-naphthyl) ether.

Cross linking agents for interpolymers of hydroxyalkyl esters are materials which contain functional groups reactive with the hydroxyl groups of the interpolymer. Examples of such coreactive materials include polyisocyanates, such as toluene diisocyanate and isocyanato-containing polymeric products, aminoplast resins, such as hexamethoxymethyl melamine and others described hereinafter; epoxy resins, such as polyglycidyl ethers of 2,2-bis(4-hydroxyphenyl)propane, commonly known as Bisphenol A; and others, e.g. silicone resins.

Alkyd resins

This group of thermosetting resins are obtained by the condensation of a polyhydric alcohol and a polycarboxylic acid.

In forming the alkyd resin which can be used in admixture with an aminoplast resin, various polyols can be used. These include glycerol pentaerythritol, dipentaerythritol, mannitol, sorbitol, trimethylolethane, trimethylolpropane, 1,3,6-hexanetrial, and others. These are usually employed in amounts approximating, or somewhat exceeding equivalency with respect to the acid component.

Usually the acid component comprises a mixture of dibasic and monobasic acids. The dibasic acids are represented by such dicarboxylic acids as phthalic acid, isophthalic acid, terephthalic acid, tetrachlorophthalic acid, tetrabromophthalic acid, carbic acid (i.e., the reaction product of maleic acid and cyclopentadiene), chlorendic acid, fumaric acid, maleic acid, itaconic acid, adipic acid and sebacic acid, or combination of these acids. The term "acid" also includes the anhydrides thereof where they exist.

It is preferable to include a substantial amount of a monocarboxylic acid in the alkyd resin. Appropriate monocarboxylic acids comprise saturated aliphatic acids containing about 8 to about 18 carbon atoms, such as lauric acid, palmitic acid, stearic acid, hydroxystearic acid, unsaturated acids such as oleic acid and ricinoleic acid, pelargonic acid, decanoic acid, myristic acid, cyclohexyl-carboxylic acid, 2-ethylhexoic acid, acrylic acid, methacrylic acid, abietic acid; aromatic acids such as benzoic acid, p-tertiarybutylbenzoic acid, toluic acid and others. Usually the two types of acids (dicarboxylic acid and monocarboxylic acid) employed in about equimolar amounts but these ratios can be varied if desired. Monocarboxylic acids low in or free of functional unsaturation, such as ethylenic groups, are presently preferred. The use of such acids results in the production of non-oxidizing oil modified alkyds. Pure acids or mixtures of two or more thereof with each other may be employed. Such mixtures of monobasic acids as are obtained from natural sources, such as glycerides represented by coconut oil, soya oil, corn oil, cotton seed oil, are examples of useful mixtures of useful acids. Acids distilled from tall oil may be employed.

Mixtures of aliphatic monocarboxylic acids, such as coconut oil acids, and about 5 to 30 percent by weight of an aromatic monocarboxylic acid, such as benzoic acid, may be used as the monocarboxylic acid component of the resin.

The fatty acids need not necessarily be employed as free acids but may be employed as partial esters of a polyol such as glycerol, pentaerythritol, or other polyhydric alcohol. Such partial esters will average about 2 available hydroxyl groups per molecule and they are reacted by esterification with a dicarboxylic acid such as herein disclosed to provide an alkyd resin.

The sums of the acids usually are employed in slightly less (e.g., 1 to 10 molar percent) than molar equivalency with respect to the polyhydric alcohol. The two types of acids (dicarboxylic and monocarboxylic) are also most often employed in approximately equal moles. However, variations in this respect are also contemplated. The range may be, for example, about 30 to 70 molar percent of one of the said acids, the remainder being the other.

Further details for the preparation of alkyd resins are described in the book entitled "Organic Coating Technology," Volume I, by Henry F. Payne, published by John Wiley & Sons (1954), chapter 7.

Cross linking agents for the alkyd resins, where one is desired, include those materials which contain functional groups reactive with the hydroxyl groups of the alkyd, examples of which have been previously described in relation to cross linking agents for interpolymers of hydroxy alkyl esters. The preferred cross linking agents are aminoplast resins which will be more fully described hereinafter. Various proportions of alkyd resin and aminoplast resin cross linking agent may be employed as the thermosetting resin component of this invention. For example, the aminoplast resin may constitute from about 5 to about 50 percent by weight of the mixture of the two resins, although this ratio is not critical. The blend of the alkyd resin and the aminoplast resin may also include various added vehicular agents such as plasticizers represented by epoxidized oils, so-called chemical plasticizers such as triphenyl phosphate, tricresyl phosphate, dicyclohexyl phthalate, butylbenzyl phthalate, and others.

Aminoplast resins which are the preferred cross linking agents for interpolymers of hydroxyl esters of unsaturated acids and for alkyd resins are derived from the reaction of a compound containing a plurality of —$NH_2$ groups (e.g., urea, melamine, acetoguanamine or benzoguanamine) with an aldehyde or a substrate acting as an aldehyde (e.g., formaldehyde). In preparing aminoplasts, the aldehyde or its equivalent is usually dissolved in an alkanol, such as butyl alcohol, and at least a part of the N-methylol groups on the aminoplast are converted into N-oxyalkyl groups as represented by the formula:

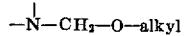

These groups are distributed as side chains in the resin molecules. Butanol may be replaced by other monohydric aliphatic alcohols containing from about 1 to about 8 carbon atoms and being represented by methyl alcohol, ethyl alcohol, propyl alcohol, isopropyl alcohol, butyl alcohol, isobutyl alcohol, pentyl alcohol, hexyl alcohol and octyl alcohol. All of these are primary or secondary alchols. Such resin contain

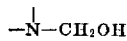

groups and

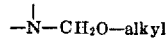

groups, wherein the moiety designated as "alkyl" ordinarily contains from 1 to 8 carbon atoms. It is preferred that the alkyl groups be methyl or butyl—i.e., that the curing agent be a methylated or butylated aminoplast.

When employing the alkoxylated aminoplast resins as the cross linking agents as described hereinabove, substantial gel structure should be established in the film prior to subjecting the film to the final curing temperatures, i.e., temperatures above about 150° F., if it is desired to obtain films which are optically enhanced on account of the light scattering voids. If substantial gel structure is not established in the film prior to subjection of the uncured resin to the final curing temperatures, the film will flow, thereby collapsing the light scattering voids produced by the non-solvent. The resulting film would thereby be a highly cross linked mar resistant film in which the optical properties are only affected by the additives in the film.

One preferred method for obtaining substantial gel structure in the high temperature curing systems of this invention is to add a small amount of a mineral acid or other known curing agent suitable for the cross linking materials in the system. Among the preferred mineral acids which may be added to the thermosetting system to cause substantial gel structure at lower temperatures are phosphoric acid and its mono- and dialkyl esters, sulfuric acid and its amine salts, e.g., morpholine. Phosphoric acid and its esters are the most preferred curing agents since they are soluble in most of the polymer systems contemplated for the purpose of this invention.

One method for determining whether a film has established substantial gel structure as indicated hereinabove is to determine if the film has reached a tack-free state. In the paint and coatings industry, a common method for determining if a film is tack-free is by the use of the "cotton test" or "Cotton Fiber Method." When a film is tack-free, cotton threads no longer adhere to the film. Specifically, this tack-free state of the film can be determined by A.S.T.M. Method D 1640-65T 5.2.1 whereby cotton fibers are dropped onto the film at regular drying intervals on a specified portion of the film. The film is considered tack-free when the cotton fibers can be removed by blowing lightly over the surface of the film.

Another method for determining whether the film is tack-free is by employing the "Powder Method" described as A.S.T.M. Method D 1640-65T 5.2.2. This method is conducted by depositing finely divided calcium carbonate (pigment grade) on the film at definite intervals during the drying period and when the film has dried to a tack-free state, the pigment can be removed by blowing with a gentle stream of air and wiping with a soft rag or camel hair brush. The film is considered tack-free when the pigment can be removed completely.

When the film reaches a tack-free state, it is ready to undergo final curing conditions by baking at temperatures usually above 150° F. and the film will not flow thereby collapsing the voids formed by the nonsolvent.

In a particularly preferred embodiment of the invention, cellulose ester resins are used in conjunction with the aminoplast resins. The addition of the cellulose ester resins further aids in establishing the gel structure at lower temperatures so that the voids in the film will be able to withstand cross linking conditions during the final curing stage. Among the preferred cellulose ester resins used for the foregoing purpose are cellulose acetate butyrate, cellulose acetate propionate and cellulose acetate. It will be understood by those skilled in the art that many other derivatives of cellulose may also be used.

Further information as to the preparation and characteristics of aminoplast resins are contained in the aforementioned book entitled "Organic Coating Technology," chapter 8, pages 326 to 350.

Thermosetting resin compositions comprising mixtures of an interpolymer of a hydroxyalkyl ester and an aminoplast resin are further described in U.S. Pat. Nos. 2,681,897; 3,375,227 and 3,382,294; and further details for the preparation of aminoplast resins and alkyd resins which may be employed are described in U.S. Pat. No. 3,113,117.

Aldehyde modified interpolymers of ethylenically unsaturated carboxylic acid amides with at least one other polymerizable ethylenically unsaturated monomer This group of thermosetting resins which may be used are of the type disclosed in U.S. Pat. Nos. 2,870,117; 2,978,434; 3,037,963 and 3,118,853. These interpolymers are prepared by forming an interpolymer of from about 2 to about 50 percent based upon the total weight of the interpolymer of an unsaturated carboxylic acid amide, such as acrylamide or methacrylamide, with at least one other polymerizable ethylenically unsaturated monomer, and then reacting the interpolymer with an aldehyde, such as formaldehyde, usually in the presence of an alcohol, such as butanol. While formaldehyde is the most often used aldehyde, others such as acetaldehyde, butyraldehyde, furfural, etc., can be employed if desired.

In the reaction with aldehyde, amido hydrogen atoms are replaced with an alkylol group; if further reaction takes place with butanol or other alcohol, etherification of at least some of the alkylol groups in the above structure results in groups of the structure

wherein R is a saturated lower aliphatic hydrocarbon radical derived from the aldehyde, and $R_1$ is the radical derived by removing the hydroxyl group from the alkanol.

It is desirable that at least about 50 percent of the alkylol groups be etherified since compositions having less than about 50 percent of the alkylol groups etherified may tend to be unstable and subject to gelation. Butanol is the preferred alcohol for use in the etherification process, although any alcohol such as methanol, ethanol, propanol, pentanol, octanol, decanol, and other alkanols containing up to about 20 carbon atoms may also be employed as may aromatic alcohols such as benzyl alcohol or cyclic alcohols.

While either acrylamide or methacrylamide is preferred for use in forming the interpolymer component, any unsaturated carboxylic acid amide can be employed. Such other amides include itaconic acid diamide, alpha-ethyl acrylamide, crotonamide, fumaric acid diamide, maleic acid diamide, and other amides of alpha, beta-ethylenically unsaturated carboxylic acids containing up to about 10 carbon atoms. Maleuric acid, and esters thereof, and amide derivatives such as N-carbamylmaleimide may also be utilized.

Any polymerizable monomeric compound containing at least one

group may be polymerized with the unsaturated carboxylic acid amide. These include monoolefiinic and diolefiinic hydrocarbons, unsaturated esters of organic and inorganic acids, esters of unsaturated acids, nitriles, unsaturated acids, and the like. Examples of such monomers include styrene, isobutylene, 1,3-butadiene, 2-chlorobutene, vinyl chloride, vinylidene chloride, alpha-methylstyrene, alpha-chlorostyrene, 2-chlorostyrene, 2-chloro-1,3-butadiene, 1,1-dichloroethylene, vinyl butyrate, vinyl acetate, allyl chloride, methyl methacrylate, methyl acrylate, ethyl methacrylate, ethyl acrylate, butyl methacylate, butyl acrylate, lauryl methacrylate, acrylonitrile, methacrylonitrile, acrylic acid, methacrylic acid and vinyl silicone containing compounds.

Aldehyde-modified and etherified amide interpolymers can also be produced by first reacting the unsaturated amide with an aldehyde and, if desired, an alcohol, to form an N-alkylol or an N-alkoxyalkyl-substituted amide. The N-substituted amide then is interpolymerized with the other monomer or monomers as described above, thereby producing interpolymers having the aforesaid recurrent groups without the need for further reaction. Such a method utilizing N-alkoxyalkyl substituted amides is described in U.S. Pat. No. 3,079,434.

Polyepoxy resins

This group of thermosetting resins may also be used in the practice of this invention. The epoxy resins are generally prepared by the combination of a polyhydric compound with epichlorohydrin in combination with a nucleophilic curing agent. Epoxy resins are well known in the art, and generally include any epoxide compound or mixture which has a 1,2-epoxy equivalency of greater than 1.0. Examples of such epoxy resins are described in U.S. Pat. Nos. 2,467,171; 2,615,007; 2,716,123; 2,786,066; 3,030,336; 3,053,855; and 3,075,999. These include reaction products of epichlorohydrin or dichlorohydrin with a polyhydric compound; polyepoxides derived from the epoxidation of definically unsaturated alicyclic compounds; epoxidized oils; and the like.

Suitable polyhydric compounds which may be used as reactants to prepare the epoxy resins include ethylene glycol, diethylene glycol, 1,3,5-tri-hydroxybenzene, resorcinol, 1,5 - dihydroxynaphthalene, 2,2,5,5-tetrakis(4-hydroxyphenyl) hexane, 2,2-bis(4-hydroxyphenyl)propane, commonly known as, bisphenol A and polyethers of polyalkylene oxide polyols with functionally substituted phenols (e.g. the epoxides disclosed in U.S. Pat. Nos. 3,134,191 and 3,393,229). 2,2-bis(4-hydroxyphenyl) propane, i.e., bisphenol A is the preferred polyol employed in the practice of this invention due to its availability and highly desirable properties.

Epichlorohydrin may also be condensed with other types of compounds to produce excellent epoxy resins which may be used in the practice of this invention. Among these other compounds are mono- or polysulfonamides and hydrazines. For example, 2,4-toluenedisulfonamide and epichlorohydrin yields an intermediate which upon condensing with 5% piperdine forms a polymer softening above 100° C. A similar resin can be prepared from epichlorohydrin and N,N-dimethyl-2,4-toluenesulfonamide with piperdine.

Another group of useful epoxy containing polymers which may be employed in the practice of this invention are copolymers of acrylates, such as 2-ethylhexyl acrylate and/or methacrylates such as methyl methacrylate, with up to 50% of a comonomer such as dibutyl maleate or fumarate, butyl glycidyl maleate or fumarate and glycidyl methacrylate. Solvents useful for these polymer systems include benzene, toluene, butanol, acetone or xylene.

Cross linking agents for the epoxy resins include acids or amines, or by those substances containing active hydrogen. These nucleophilic curing agents, used in as much as 30 to 40% can be organic acids, mono- or polyamines, or resinous substances such as the phenolic, urea, melamine and sulfonamide resins, as well as polysulfide polymers, polyamines (ethylenediamine) and polyamides, etc. The relative proportion of curing agent to epoxy resin is not critical, but there is generally from about 5 to about 50 percent of curing agent employed for this purpose. The resulting epoxy resin upon reaction or cross linking with these materials no longer have the terminal epoxide groups.

One of the preferred cross linking agents are the amine containing compounds such as ethylene diamine, diethylene triamine, triethylene tetramine tetraethylene pentamine, and the like. Tertiary amines such as dimethylaminomethylphenol, 2,4-6 - tri(dimethylaminomethyl) phenol and benzyl dimethylamine are also useful cross linking agents for the epoxides of this invention.

Another preferred group of curing agents for the epoxy resins are the amine salts of fatty acids. These materials are heat-activated curing agents. These amine salts may be obtained by completely or partially neutralizing an amine with a fatty acid. The amines which may be employed for this purpose include methylamine, dimethylamine, trimethylamine, hexamethylenediamine, morpholine and diethylenetriamine. The fatty acids which may be used to form the salts may be either saturated or unsaturated and include formic, acetic, propionic, butyric, caprylic, stearic, oleic, linoleic, linolenic, acrylic, methacrylic, crotonic, vinylacetic acid and derivatves thereof. A neutral salt results by combining a mole of the amine with the exact number of moles of fatty acid corresponding to the number of amino groups present in the amine molecule. Since these resins are generally cured at high temperatures, there should be substantial gel structure established in the film prior to subjecting the film to final baking temperatures in order to obtain a film containing light scattering voids therein. If substantial gel structure is not established at low temperatures prior to the final baking, the high temperatures will cause the partially gelled film to flow thereby collapsing the light scattering voids formed by the non-solvent. The desired gel structure may be obtained in the film at lower temperatures by the addition of a suitable mineral acid or amine activating agent.

Another particularly preferred group of cross linking agents useful in curing the epoxy resins are the aminoplast resins described hereinabove. However, when using many of the aminoplast resins it will be necessary to incorporate a mineral acid or other curing agents to accelerate the curing at low temperatures so that substantial gel structure may be established prior to final curing as described hereinabove. Among those most preferred aminoplast resins are the alkoxylated melamines and ureas as described hereinabove. Various proportions of epoxy resin and aminoplast cross linking agent may be employed as the thermosetting resin component of this invention. For example, the aminoplast resin may constitute from about 5 to about 50 percent by weight of the mixture of the two resins, although this ratio is not critical.

Other cross linking agents for the epoxy resins which may be used in accordance with the practice of this invention are the acid curing agents such as acid anhydrides, e.g., succinic, maleic, phthalic acid anhydrides and their derivatives. Various polymerized anhydrides may be used such as polyadipic and polysebacic acid anhydride. Most of the acid curing agents such as the ones mentioned herein cure catalytically in the presence of a mineral acid catalyst at room temperature. In such instances, it is desirable to incorporate from 0.1 to 5% of a mineral acid catalyst to cause initial curing at room temperature so that substantial gel structure may be established prior to baking. There also may be employed the phenol-formaldehyde resins as curing agents for the epoxy resins to obtain extremely durable films. These resins are generally heat activated so it is generally desirable to add an acid or amine curing agent to initiate curing at lower temperatures so the proper gel structure can be established prior to final curing.

Aminoplast resins

This group of resins has been described in detail hereinabove with respect to being used as a cross linking resin for the other resin systems. However, this group of resins as described in detail hereinabove, may also be employed alone as thermosetting resins which are useful in the practice of this invention.

Mixtures of two or more thermosetting resins may also be employed.

Among the various thermoplastic resins which can be employed in the organic coating compositions as well known in the art such as:

Cellulose derivatives—These polymers include ethyl cellulose, nitrocellulose, cellulose acetate, celluose propionate and celuose acetate butyrate;

Acryic resins—Typical thermoplastic acrylics are homopolymers and copolymers of esters of acrylic and methacrylic acid with each other or with other monomers of methyl acrylate, methyl methacrylate, ethyl acrylate, ethyl methacrylate, butyl acrylate, butyl methacrylate, acrylic acid and methacrylic acid;

Polyolefins—Included in this group are polyethylene and polypropylene, polystyrene, copolymers of styrene and other vinyl monomers such as acrylonitrile;

Vinyl polymers—Included here are homopolymers and copolymers of vinyl acetate, vinyl alcohol, vinyl chloride and vinyl butyral as well as homopolymers and copolymers of dienes such as polybutadiene, butadienestyrene copolymers and butadiene-acrylonitrile copolymers.

Also included are various other well known thermoplastic resins such as nylon and polycarbonate.

Graft copolymers or block copolymers—This group of thermoplastic resins include copolymers which possess segmental periodicity—i.e., they contain continuous sequences of one monomer that are not governed by statistical distribution. They may be formed by methods known in the art such as by polymerizing a vinylidene monomer in the presence of an appropriate preformed polymer and catalyst. Specific details for the preparation of graft copolymers are described, for example, in U.S. Pat. No. 3,232,903. The performed polymer may be, for example, a polymeric ester of acrylic acid or methacrylic acid such as copolymer of an ester of methacrylic acid or acrylic acid formed with an alcohol having 4 to 18 carbon atoms or of mixtures of such esters with esters of methacrylic acid or acrylic acid formed with alcohols having 1 to 5 carbon atoms. Mixtures of methacrylate and acrylate esters with from 1% to 50% by weight of monoethylenically unsaturated monomers such as maleic anhydride, acrylic acid, methacrylic acid, vinyl pyrrolidone, N-dimethylaminoethyl acrylate or methacrylate, N,N-dimethylaminoethylacrylamide or methacrylamide, dimethylaminoethyl vinyl ether, dimethylaminoethyl vinyl sulfide, vinyl acetate, vinyl propionate, vinyl laurate, vinyl stearate, vinyl oleate, ethylene, isobutylene, acrylamide, methacrylamide, acrylonitrile, methacrylonitrile, vinyl ethyl ether and vinyl isobutyl ether may also be used in the preparation of the preformed polymer.

Vinylidene monomers which may be polymerized in the presence of the preformed polymer include vinyl esters of fatty acids having from 1 to 18 carbon atoms such as vinyl acetate, vinyl propionate, vinyl butyrate, vinyl laurate, vinyl oleate and vinyl stearate; esters of acrylic acid or methacrylic acid with alcohols having from 1 to 18 carbon atoms such as methyl acrylate, methyl methacrylate, ethyl acrylate, ethyl methacrylate, propyl acrylate, propyl methacrylate, isopropyl acrylate, isopropyl methacrylate, butyl acrylate, butyl methacrylate, cyclohexyl acrylate, cyclohexyl methacrylate, etc.; acrylonitrile, methacrylonitrile, acrylamide, methacrylamide, styrene, α-methylstyrene, vinyl toluene, acrylic acid, acrylic acid anhydride, methacrylic acid, methacrylic acid anhydride, maleic anhydride, fumaric acid crotonic acid, allyl acetate, glycidyl methacrylate, t-butylaminoethyl methacrylate; hydroxyalkyl acrylates or methacrylates such as β-hydroxyethyl methacrylate, β-hydroxyethyl vinyl ether, β-hydroxyethyl vinyl sulfide, vinyl pyrrolidone, N,N-dimethylaminoethyl methacrylate, ethylene, propylene, vinyl chloride, vinyl fluoride, vinylidene fluoride, hexafluoropropylene, chlorotrifluoroethylene, and tetrafluoroethylene.

Natural occurring polymeric materials which may be employed include materials such as casein, shellac and gelatin.

Mixtures of two or more thermoplastic resins may also be used in this invention. Thus, for example, when a graft copolymer is prepared as described above by polymerizing a vinylidene monomer in the presence of an appropriate prepolymer, there is generally obtained a mixture of a graft copolymer comprising grafts of the vinylidene monomer on the prepolymer, and a homopolymer of the vinylidene monomer (or a copolymer if two or more different vinylidene monomers are employed). This mixture of polymers may be used as such in the practice of this invention or it may be separated into its component parts and either the graft copolymer or homopolymer used alone.

The film forming polymeric materials may be added to and dissolved in the solvent system as such. Alternatively, the corresponding monomer or monomers may be added to the solvent system aand the film forming polymeric material then formed in situ by polymerizing the monomers in the solvent system. Polymerization catalysts, such as organic peroxides, and polymerization modifiers such as tertiary dodecyl mercaptan and carbon tetrachloride may be employed in accordance with well known techniques. If the system contains a polymer containing free hydroxyl groups, a cross linking agent, such as an organic diisocyanate or a conventional aminoplast may be employed. Ethylenically unsaturated monomers may be polymerized in the solvent system in the presence of a preformed polymer, in which case there may occur either graft polymerization of the monomer on the preformed polymer or, if the preformed polymer contains ethylenic unsaturation, cross linking of the preformed polymer.

The solvent system which is used in the practice of this invention comprises a mixture of at least two miscible liquids. It is not necessary that any of the liquids used in the solvent system taken individually be a solvent for the film forming polymer so long as the polymer is soluble in them in admixture. At least one of the liquids in the solvent system, however, must be a non-solvent for the polymer and this liquid must have a substantially lower volatility than that of the other liquids in the solvent mixture.

As used herein, the term "non-solvent" is used to denote a liquid in which the polymer does not dissolve to any appreciable extent.

The amount of the low volatility non-solevnt liquid present in the solvent system is preferably just enough to produce, upon the removal of the solvent mixture from a film formed from the composition having in the absence of materials such as soluble, optical brighteners and fluorescent materials, a Kubelka-Munk scattering coefficient greater than 0.5 reciprocal mils at 4400 angstroms and greater than 0.1 reciprocal mils at 5600 angstroms. However, the amount of the low volatility non-solvent present in the solvent system must be less than that which, upon removal of the solvent mixture from a film formed the composition, would produce a discontinuous film—i.e., a film containing interconnected open cells or breaks as contrasted with a continuous film containing non-interconnected cells.

When these requirements are met and a film is formed from the composition, the more volatile liquid evaporates at a greater rate than the low volatility non-solvent. After a portion of the solvent mixture has evaporated, the film forming polymer gels and thereafter, the low volatility non-solvent liquid precipitates as minute droplets in the polymer matrix which forms a rigid structure. subsequently, the low volatility non-solvent evaporates leaving microscopic voids in the rigid structure. These microscopic voids cause light scattering and opacity and result in the film being microporous and having in the absence of an opacifying agent a Kubelka-Munk scattering coefficient as previously defined.

If not enough of the lower volatility non-solvent is present in the system prior to establishing a rigid structure as defined hereinabove, a film formed from the composition may appear upon drying or curing as a clear or a blushed film having in the absence of an opacifying agent a Kubelka-Munk scattering coefficient less than 0.5 reciprocal mils at 4400 angstroms and less than 0.1 reciprocal mils at 5600 angstroms and will not contain sufficient mircopores to cause opacity. It has been unexpectedly found, however, that the presence of soluble, optical brighteners and fluorescent materials have a synergistic effect when present in combination with the non-solvent in the compositions of this invention, i.e., the combination of these two ingredients provides a film with greatly enhanced optical properties which totally is unexpected since the prior art films which are rendered opaque by the incorporation of pigment do not possess the unique optical properties when fluorescent materials and/or optical brighteners are added thereto.

It will be understood, of course, as described hereinbelow, compositions containing a gelable polymer, solvents and non-solvents therefore, as well as an additive such as soluble, optical brighteners and/or fluorescent materials have utility in and of themselves despite the fact that under some conditions they will not produce a film containing discrete, light scattering viods therein—e.g., subjecting a thermosetting resin system containing an alkoxylated aminoplast to high temperature curing prior to establishing substantial gel structure.

If too much of the lower volatility non-solvent is present in the system prior to obtaining the rigid structure, the polymer may precipitate from the mixture before it gels and a film formed from such a composition will be discontinuous and contain undesirable interconnected or connected voids throughout the film structure. Such films are not desirable for thin film coatings as contemplated by this invention since these coatings will not offer the desirable protection of most substrates often required by consumers and manufacturers. Furthermore, such films as coatings would be highly permeable throughout the film structure and would be capable of allowing undesirable liquids to permeate through the open void structure to the substrate coated with such a film.

In order to obtain the desired results of this invention, it is important to control the amount of non-solvent in the resin system. Of course, the amount of liquid non-solvent will vary from one solvent to another depending upon the volatility of the liquid non-solvent and the amount of resin in the composition. For example, when employing a non-solvent of very low volatility, a smaller quantity of non-solvent will be needed to obtain the desired results than when employing a highly volatility liquid non-solvent. Preferably, there should be sufficient liquid non-solvent present in the composition as to either produce the enhanced optical effect the non-solvent synergistically has on the additives or enough non-solvent to lower the viscosity and decrease the amount of solvent ordinarily needed. Preferably, there will be enough non-solvent present such that upon removal of the solvent mixture from the film, the film will have in the absence of the aforementioned additives a Kubelka-Munk scattering coefficient as described above.

The amount of non-solvent can be determined for any particular system by a simple test. However, it has been found that for most of the resin and solvent systems of this invention the ratio of liquid non-solvent to polymer solids content in parts by weight should be from about 1:3 to about 3:1. Preferably, the ratio should be from about 0.5:1 to about 2.5:1 of non-solvent to polymer solids in parts by weight.

The relative proportions of resin and volatile organic solvent for the polymer are not critical. However, the concentration of the resin solvent should be kept sufficiently low so that the viscosity of the solution is in the proper range for uniform application and ease of coating. Subject to this limitation, the concentration of the resin should obviously be as high as possible in order to minimize the cost of the solvent and to provide a film of the desired thickness to obtain an adequate coating as described hereinabove.

The relative proportion of solvent and non-solvent is not critical and will obviously vary depending upon the particular solvent and non-solvent used as well as upon the identity and concentration of the resin employed.

The relationship of the amounts of the miscible liquids which comprise the solvent mixture may best be understood by reference to the generalized rectangular phase diagram shown in the figure. This diagram illustrates three distinct zones which are dependent upon the concentration of the materials in the compositions. Coatings deposited from a composition which comes within zone A are continuous, tend toward being transparent and for the most part non-porous. As the composition approaches the boundary of zone B, the coatings deposited exhibit a blush. Coatings produced from compositions falling within zone C are extreme as compared to those in zone A in that the composition dries as a polymer containing open cell interconnected voids or as a precipitated, powdery, discontinuous film. However, coatings produced from compositions in zone B are continuous and exhibit many of the macro-properties of the polymer itself and also exhibit optimum Kubelka-Munk scattering coefficients as previously defined. As the compositions within zone B approach the boundary of zone C, the coatings deposited, upon removal of all solvent mixture exhibit higher Kubelka-Munk scattering coefficient. In those instances where a pigment has been added to the film forming compositions as contemplated by this invention, the coatings become increasingly more white upon approaching the boundry of zone C, as well. Therefore, the compositions of this invention are those which fall within zone B and pass through line B–F upon removal of solvents. Lines G–F and G–B may be approximated by straight lines when the evaporation rate of the true solvent is much greater than that of the non-solvent.

The particular liquids which are used in the solvent mixture depend upon the particular film forming polymer used. A liquid which is the more volatile component in one system may be the lower volatility non-solvent in a different system. Classes of liquids which may be employed include ketones, esters, alcohols, aliphatic, aromatic and chlorinated hydrocarbons and the like.

Solvents

The volatile liquid organic solvents which have been found particularly useful in the practice of the present invention include alcohols such as methanol, ethanol, propanol, n-butanol, amyl alcohol, cyclohexanol, hexanol, and the like; esters such as methyl acetate, ethyl acetate, isopropyl acetate, butyl acetate, amyl acetate, diethylene glycol monobutyl ether acetate, ethylene glycol monobutyl ether acetate, ethylene glycol monoethyl ether acetate (Cellosolve acetate), 2-ethyl acetate, and the like; ketones such as acetone, methyl ethyl ketone, di-isobutyl ketone, ethyl amyl ketone, ethyl butyl ketone, methyl isobutyl ketone, and the like; ethers such as propylene glycol methyl ether, di-propylene glycol methyl ether, and the like; aromatic hydrocarbons such as benzene, toluene, xylene, and various commercially available mixed aromatic hydrocarbons; chlorinated hydrocarbons such as chloroform, ethylene dichloride, methylchloroform, trichloroethylene dioxide, and the like; and various known aliphatic hydrocarbons. As indicated hereinabove, mixtures of these solvents can be employed as long as the solvents are miscible with the non-solvent and are of higher volatility than the non-solvent.

Non-solvents

The non-solvents which have been found particularly useful in the practice of this invention include petroleum fractions, particularly the aliphatic and aromatic hydrocarbon fractions such as odorless aliphatic mineral spirits [boiling point range 349° F. to 406° F., refractive index 1.4217 at 20° C., specific gravity 0.754 (60/60° F.) and a Kauri-Butanol value of 25.3], hi (high) flash aromatic naphtha [boiling point range 367° F. to 421° F., refractive index 1.5075 at 20° C. specific gravity 0.893 (60/60° F.) and a Kauri-Butanol value of 89.1], very high flash naphtha [boiling point range 344° F.–533° F., specific gravity 0.926 (60/60° F.) and a Kauri-Butanol value of 100], turpentine (steam distilled) [boiling point range 313° F.–324° F., specific gravity 0.862 (60/60° F.)], hexane, heptane, octane, iso-octane, and the like; alcohols such as methanol, ethanol, propanol, butanol, 2-ethoxyethanol and the like; esters such as butyl acetate, butyl lactate, 2-ethoxyethyl acetate, and the like. The choice of the particular non-solvent liquid will depend, of course, upon the identity of the resin selected. A liquid which is a non-solvent for one resin may be a good solvent for another resin, as is well known. The petroleum fractions such as hi flash aromatic naphtha are particularly preferred for use in the resin systems of this invention because of their very low solvent power for most of these resins.

As described in parent application Ser. No. 4,175, filed Jan. 14, 1970, previously incorporated herein by reference, various other ingredients may be added to the above compositions which will not interfere with the relationship between the film forming, gelable polymer and the solvent mixture. Examples of such added ingredients include additional polymers which may modify the properties of the film.

It has now been discovered that if soluble optical brighteners, and/or fluorescent materials are incorporated in the basic compositions of the above-cited parent application, to thereby form novel compositions as contemplated by this invention, the additives have a greater affect than the prior art films. Also, it is possible to employ far less additives than heretofore employed and still obtain the same or greater brightness and whiteness of the prior art films with these additives.

As stated hereinabove soluble optical brighteners, fluorescent materials and mixtures thereof are incorporated within the compositions of the cited parent application in order to effect their enhanced characteristics to thereby As described in parent application Ser. No. 4,175, filed form unique films, coatings, and compositions as contemplated by this invention.

Optical brighteners are well known in the art and are generally defined herein as those materials which absorb light energy in the ultraviolet region of light and emit energy across large portions of the entire visible region of light. Thus, such materials serve to brighten the vehicles which carry them.

Fluorescent materials are likewise well known in the art and are generally defined herein as those materials which absorb light energy at a shorter wave length of light and emit light energy of a given wave length (i.e., color) in the visible region of light. Thus, such materials brightly color the vehicles which carry them.

The incorporation or soluble optical brighteners and fluorescent materials into the compositions of this invention achieves a unique and enhanced effect in the resulting films. That is to say, prior films which are rendered white and opaque by the addition of $TiO_2$ thereto are only brightened or colored by the addition of optical brighteners and fluorescent materials to a limited degree. This is due primarily to the fact that $TiO_2$ screens substantially all of the ultraviolet light from the soluble optical brightener or fluorescent material since it absorbs ultraviolet light. The films of this invention, without the addition of $TiO_2$, are highly white and opaque in and of themselves due to the discrete closed cells therein and thus contain nothing other than possibly the polymers functional groups which will absorb ultraviolet light. When soluble optical brighteners and fluorescent materials are incorporated into the compositions, their affect upon the resulting films is maximized.

The term "soluble optical brighteners and fluorescent materials" refers to those additives which form a part of the continuous phase of the entire composition—i.e., the additives are soluble in the polymer solvent and non-solvent to form a homogeneous phase rather than a dispersion of more than one distinct phase. In other words, the soluble optical brighteners and fluorescent materials contemplated by this invention do not interact chemically with either the polymers, solvents or non-solvents in the composition.

As previously alluded to the "soluble fluorescent material of optical brightener" which are employed will be soluble in the solvent mixture as a whole. Such solubility characteristics play a large role in governing the ultimate location of the brightener or fluorescent material in the finally formed film. For example, since the optical brightener or fluorescent material used is soluble in the non-solvent liquid of the solvent mixture, it is to be expected that much of the optical brightener, upon removal of the solvent mixture from the film, will be located at least partially within the discrete closed cells which are formed by entrapment of minute droplets of the liquid non-solvent. The affects of these materials are optimized when compared with UV absorbing pigmented opacified films heretofore used, since there is nothing present other than possibly the functional groups of the polymer in the films of this invention except for the fluorescent materials and optical brighteners which will absorb ultraviolet light.

Generally speaking any well known fluorescent material, optical brightener or combinations and mixtures thereof may be employed in this invention as long as they are soluble in the total film composition comprising the polymers, solvents, and non-solvents. Examples of soluble fluorescent materials which may be employed include such well known compounds as ethylene glycol laurate, glyceryl monostearate, glyceryl tristearate, diethylene glycol monoethyl ether citrate, diethylene glycol monoethyl ether phthalate, 8-hydroxyquinoline, oleic acid, butyl pyrogallol, butyl acetylricinoleate, butyl ricinoleate, decyl naphthalene, o-cresol, 2-amino-2-methyl 1,3-propandiol, and the like. Examples of soluble optical brightners which may be employed include such well known compounds as diethylene glycol monoethyl ether laurate, dibutyl sebacate, and the like. The choice of the particular fluorescent material and/or optical brightener will depend, of course, upon the identity of the resin selected and the desired optical properties sought to be obtained in the film. As it is well known by those of skill in the art, a soluble optical brightener or fluorescent material which is soluble in one resin system may not be necessarily soluble in another resin system. Thus, the particular additive used may be easily selected by inquiry to the various solubility tables for the respective resins and additives employed.

The compositions of this invention may be formed into a film by techniques well known in the art. Thus, they may be applied as a film by brushing, spraying, dipping, roller coatings, knife coating, roll coating, electrodepositing or calendering.

The compositions of this invention are particularly useful when employed in spray applications due to the presence of the non-solvent in the composition. The compositions of the present invention containing the non-solvent have a lower viscosity at corresponding solids content thereby permitting easier atomization of a higher solids content of resinous material than compositions not containing a non-solvent. Therefore, fewer coats are necessary to obtain the desired thickness of film by spray application using the compositions of this invention.

The compositions of this invention are also useful as paint compositions where it is desirable to decrease the amount of solvent. The compositions of this invention can therefore be prepared at a lower initial cost than previous coating compositions which employ only solvents for the polymer since a smaller amount of expensive solvent is necessary. Furthermore, the liquid non-solvents which may be employed in the practice of this invention such as the aliphatic hydrocarbon petroleum fractions— e.g., ordorless mineral spirits are not nearly as expensive or toxic as most of the solvents in common use today.

Thus, the compositions of this invention are not only useful in that they are capable of producing films having enhanced optical properties, but are also useful in a real commercial sense from the standpoint of cost of raw materials and low toxicity.

The compositions of this invention may be applied as films to various types of surfaces or substrates. These surfaces may be of the type wherein the film is to be subsequently removed by a suitable method or of the type which is the final substrate such as the metal surface of an automobile. Among the more suitable surfaces which may be coated with the compositions of this invention are steel, treated steel, galvinized steel, cement, glass, fabrics, fiber glass, wood, plaster board, aluminum, treated aluminum and plastics. The most preferred surfaces are metals such as treated steel and treated aluminum.

Films formed from the compositions of this invention may be air dried, vacuum dried or bake dried at elevated temperatures.

The films produced by the practice of this invention are characterized by the presence therein of a large number of discrete closed cells. Substantially all of these cells or voids are less than 2 microns, and preferably less than 0.5 micron, in size. The size of the cells ranges downward to the size of the film forming polymer molecule. Films formed from many of the compositions of this invention contain closed cells essentially none of which are larger than 0.1 micron. In other films, the average size of the cells may be 0.25 micron.

The coating compositions of this invention may be utilized as free films on substrates, as in automotive finishes, appliance finishes and in similar protective and decorative coatings. Such coatings may have thicknesses ranging up to 10 mils or more. Many of the coatings of this invention, particularly the highly cross linked films, are extremely tough and abrasion resistant. When the compositons of this invention include fluorescent materials and/or optical brighteners, they are brillant when viewed by the eye. When non-coloring soluble optical brighteners are used for example, the films are a brillant white. When, on the other hand, colored soluble fluorescent materials are used alone or in combination with soluble optical brighteners the films brilliantly radiate the color of the fluorescent material.

The following examples serve to more fully describe the manner of making and using the above described invention as well as to set forth the best modes contemplated for carrying out various aspects of the invention. It is understood that these examples in no way serve to limit the true scope of this invention but rather are presented for illustrative purposes only. Unless otherwise specified, all percentages are by weight.

EXAMPLE 1

A coating composition is formulated by the following procedure: a composite is first prepared using a polymer system of Polymer A (consisting of cellulose acetate butyrate containing 26% butyryl groups, 20% acetyl groups and 2.5% hydroxyl groups) in 80.0 gms. of methanol; to this dispersion there is added 70.0 gms. of a solution of Polymer B (which contains 38.9% solids content of a polymer consisting of 91.25% methyl methacrylate, 2.0% acrylamide, 4.25% hydroxylethyl methacrylate and 2.5% methacrylic acid reacted with ethylenimine dissolved in a liquid mixture of 73% toluene, 21.5% butanol, and 5.5% xylene); 23.2 gms. of a solution of Polymer C (a cross linking agent which contains 65% solids content of butylated melamine formaldehyde condensation product in xylene and butanol); 6.0 gms. of a solution having 65% solids content of a glycidyl ether of 2,2-bis(4-hydroxyphenyl)propane, commonly known as bisphenol A (epoxide equivalent 450–525; "Epon 1001") and 160.0 gms. of Cellosolve acetate. The composite is agitated until all of the aforementioned materials are dissolved and thoroughly mixed. To the composite there is added slowly 120.0 gms. of high flash aromatic naphtha, 5.0 gms. of butyl ricinoleate, and 1.2 gms. of concentrated phosphoric acid as catalyst.

The entire mixture is thoroughly agitated until a homogeneous solution is obtained and thereafter applied to aluminum panels for evaluation utilizing the following techniques:

(1) Drawdown with a 0.003" bird applicator;
(2) Spray applied at 1.0 to 1.5 mils thickness and air dried overnight; and
(3) Spray applied at 1.0 to 1.5 mils thickness and baked for 20 minutes at 250° F.

The resulting films are bright yellow-green coatings having an optimum Kubelka-Munk scattering coefficient as described above. Each of the three panels coated with the composition of this example fluoresce brightly when an ultraviolet source is directed toward the coated panels.

EXAMPLE 2

As a comparison of Example 1, a coating composition is formulated by the following procedure: a composite is first prepared by dispersing 20.0 gms. of Polymer A in 80.0 gms. of methanol. To this dispersion there is added 39.6 gms. of a solution of Polymer B; 23.2 gms. of a solution of Polymer C; 6.0 gms. of a solution having 65% solids content of a glycidyl ether of 2,2-bis(4-hydroxyphenyl)propane, i.e., bisphenol A (Epon 1001) and finally adding 158.0 gms. of Cellosolve acetate. The composition is agitated until all of the aforementioned materials are dissolved and thoroughly mixed. This composite is slowly added to a pigment paste containing 50.0 gms. of $TiO_2$, 30.4 gms. of Polymer B and 2.08 gms. of Cellosolve acetate. This mixture is thoroughly mixed by agitation and 5.0 gms. of butyl ricinoleate and 1.2 gms. of concentrated phosphoric acid are added.

19

The entire mixture is thoroughly agitated to a homogeneous solution and applied to three aluminum panels for evaluation utilizing the techniques described in Example 1.

The resulting films are non-cellular and do not fluoresce when an ultraviolet source is directed toward the coated panels. This result is due primarily to the fact that the added $TiO_2$ screens substantially all of the ultraviolet light from the fluorescent material since the $TiO_2$ absorbs the ultraviolet light.

EXAMPLE 3

The same procedure is followed as in Example 2, except that 120.0 gms. of high flash aromatic naphtha (the cell forming non-solvent) is added. The entire mixture is thoroughly agitated and applied to three aluminum test panels for evaluation utilizing the techniques described in Example 1. The resulting films are cellular, and do not fluoresce when an ultraviolet source is directed toward the coated panels since the $TiO_2$ screens substantially all of the ultraviolet light from the fluorescent material as in Example 2.

EXAMPLE 4

The same procedure is followed as in Example 2, except that no butyl ricinoleate is added. The resulting film is cellular but exhibits no fluorescence when an ultraviolet sources is directed toward the test panels as described above.

The comparative examples above clearly illustrate that the films containing $TiO_2$ with or without cells or voids which also contain a fluorescent material will not fluoresce when an ultraviolet source is directed on the panels coated with the films tested. This result is due primarily to the fact that $TiO_2$ screens substantially all of the ultraviolet light from the fluorescent material since $TiO_2$ absorbs the ultraviolet light itself.

EXAMPLE 5

The same procedure is followed as in Example 1, except that the fluorescent material used is diethylene glycol monoethyl ether citrate. The cellular film so formed has a blue cast and has a Kubelka-Munk scattering coefficient within the ranges as above described.

EXAMPLE 6

The same procedure is followed as in Example 1, except that the fluorescent material used is glyceryl tristearate. A bluish-violet film results.

EXAMPLE 7

The same procedure is followed as in Example 1, except that instead of a fluorescent pigment used there is added 5.0 gms. of the optical brightener, dibutyl sebacate. The resulting film is a brilliant bluish-white film having a Kubelka-Munk scattering coefficient within the above described optimum range.

EXAMPLE 8

A 500.0 gm. solution of a copolymer comprising 89.5% by weight of methyl methacrylate, 10.0% by weight of lauryl methacrylate and 0.25% by weight of methacrylic acid, the acid groups of said copolymer being reacted with an organic imine to yield amino ethyl ester termination, at 35% solids in a solvent mixture of 73% toluene and 27% methyl ethyl ketone is blended with 200 gms. of methyl ethyl ketone and 5.0 gms. of butyl ricinoleate. To this solution, there is added slowly 100 gms. of odorless aliphatic mineral spirits which is a non-solvent for the copolymer. The entire mixture is agitated to dissolve all of the ingredients. The film, in addition to having a yellowish green cast, has a Kubelka-Munk scattering coefficient of greater than 0.5 reciprocal mils at 4400 angstroms and greater than 0.1 reciprocals mils at 5600 angstroms.

EXAMPLE 9

The same procedure is followed as in Example 7, except that instead of dibutyl sebacate, there is added 5.0 gms. of diethylene glycol monoethyl ether laurate. The resulting film is a brilliant bluish-white film having a Kubelka-Munk scattering coefficient within the above described optimum range.

It will be understood by those of skill in the art that various modifications of the present invention as described in the foregoing examples may be employed without departing from the scope of the invention. For example, it is possible to use various other resin systems described above in the description of the invention in the same manner as exemplified in the examples such as for example, it is possible to incorporate various other soluble fluorescent materials and optical brighteners alone or in combination with one another to accomplish the superior results demonstrated in the foregoing examples.

I claim:

1. A polymeric coating composition which comprises a solution of at least one film forming, gelable thermoplastic or thermosetting synthetic or natural organic polymer capable of forming a single phase solution in a solvent mixture comprising at least two miscible liquids, wherein said composition contains a material selected from the group consisting of fluorescent materials, optical brighteners and mixtures thereof which are soluble in said composition, wherein at least one of the liquids in said mixture is a non-solvent for said polymer and has a lower volatility than that of the other liquids in said mixture, wherein the amount of said non-solvent liquid of low volatility present in said mixture is sufficient to provide a continuous, opaque film containing primarily discrete closed cells, upon the removal of said liquid mixture from a film of said compound, wherein the weight ratio of the non-solvent to polymer solids in said composition is from about 1:3 to about 3:1 in parts by weight.

2. A polymeric coating composition which comprises a solution of at least one film forming, gelable thermoplastic or thermosetting synthetic or natural organic polymer capable of forming a single phase solution in a miscible liquid mixture, wherein said composition contains a material selected from the group consisting of fluorescent materials, optical brighteners and mixtures thereof which are soluable in said composition, wherein at least one of the liquids in said mixture is a non-solvent for said polymer and has a lower volatility than that of the other liquids in said mixture, wherein the weight ratio of the non-solvent to polymer solids in said composition is from about 1:3 to about 3:1 in parts by weight, wherein said polymer is selected from the group consisting of admixtures of interpolymers of hydroxyl esters of ethylenically unsaturated acids with at least one other polymerizable ethylenically unsaturated monomer; admixtures of alkyd resins; aldehyde modified interpolymers of ethylenically unsaturated carboxylic acid amides with at least one other polymerizable ethylenically unsaturated monomer; polyepoxy resins; aminoplast resins and mixtures of two or more of these.

3. A composition as defined in claim 2, wherein said interpolymer admixture contains a cross linking agent.

4. A composition as defined in claim 2 wherein said polymer comprises an admixture of (1) interpolymer of a hydroxyl ester of an ethylenically unsaturated acid with at least one other polymerizable ethylenically unsaturated monomer and (2) an aminoplast resin.

5. A composition as defined in claim 4 wherein at least 2 percent by weight of said hydroxyl ester of an ethylenically unsaturated acid is interpolymerized with said ethylenically unsaturated monomers.

6. A composition as defined in claim 5 wherein said interpolymer admixture of hydroxyl esters of an ethylenically unsaturated acid is selected from the group consisting of hydroxyalkyl acrylates and hydroxyalkyl methacrylates,
wherein said ethylenically unsaturated monomer mixture is selected from the group consisting of methyl methacrylate, ethyl acrylate, styrene, vinyltoluene, acrylonitrile, methacrylonitrile, methacrylic acid, acrylic acid, 2-ethylhexyl acrylate, butyl acrylate, butyl methacrylate, and lauryl methacrylate.

7. A composition as defined in claim 6 wherein said interpolymer admixture contains a cross linking agent selected from the group consisting of aminoplast resins and organic diisocyanates.

8. A composition as defined in claim 7 wherein said aminoplast resin is an alkoxylated melamine-formaldehyde resin.

9. A composition as defined in claim 2 wherein said polymer comprises a mixture of (1) an alkyd resin and (2) an aminoplast resin.

10. A composition as defined in claim 9 wherein said alkyd resin is an oil modified alkyd resin.

11. A composition as defined in claim 2 wherein said polymer comprises an aldehyde-modified interpolymer of an ethylenically unsaturated carboxylic acid amide with at least one other polymerizable ethylenically unsaturated monomer.

12. A composition as defined in claim 11 wherein the ethylenically unsaturated carboxylic acid amide is selected from the group consisting of acrylamide and methacrylamide.

13. A composition as defined in claim 12 wherein the polymerizable ethylenically unsaturated monomer is selected from the group consisting of styrene, isobutylene, 1,3-butadiene, 2-chlorobutene, vinyl chloride, vinylidene chloride, alpha-methylstyrene, alpha - chlorostyrene, 2-chlorostyrene, 2-chloro-1,3-butadiene, 1,1-dichloroethylene, vinyl butyrate, vinyl acetate, allyl chloride, methyl methacrylate, methyl acrylate, ethyl methacrylate, ethyl acrylate, butyl methacrylate, butyl acrylate, lauryl methacrylate, hydroxyethyl acrylate, hydroxyethyl methacrylate, acrylonitrile, methacrylonitrile, acrylic acid, methacrylic acid and vinyl silicone containing compounds.

14. A composition as defined in claim 2 wherein said polymer is a polyepoxy resin.

15. A composition as defined in claim 14 which contains a cross linking agent therefor.

16. A composition as defined in claim 15 wherein said polyepoxy resin is the reaction product of 2,2-bis(4-hydroxy phenyl)propane and epichlorohydrin and said cross linking agent is an aminoplast resin.

17. A method for producing continuous, opaque films containing discrete closed cells comprising:
(a) forming a film from a homogeneous composition comprising
a film forming material containing at least one film forming, gelable thermoplastic or thermosetting synthetic or natural organic polymer, and
a material selected from the group consisting of fluorescent materials, optical brighteners and mixtures thereof which are soluble in said composition,
a solvent mixture for said film forming material comprising at least two miscible non-aqueous liquids, at least one of said liquid being a non-solvent for said polymer and having a lower volatility than that of the other liquids in said mixture, said optical brighteners, fluorescent materials and solvent mixture and said polymer forming a single phase,
wherein the weight ratio of the non-solvent to the polymer solids is from about 1:3 to about 3:1 in parts by weight,
(b) removing said solvent mixture from the film.

18. A method for producing continuous, opaque films containing discrete closed cells comprising:
(a) forming a film from a homogeneous composition comprising
a film forming material containing at least one thermosetting film forming, gelable thermoplastic or thermosetting synthetic or natural organic polymer, and
a material selected from the group consisting of soluble optical brighteners, fluorescent materials and mixtures thereof which are soluble in said composition,
a solvent mixture for said film forming material comprising at least two miscible non-aqueous liquids, at least one of said liquids being a non-solvent for said polymer and having a lower volatility than that of the other liquids in said mixture, said optical brightener, fluorescent materials and solvent mixture and said polymer forming a single phase,
wherein the amount of said lower volatility non-solvent liquid present in said mixture being at least enough to produce, upon the removal of said solvent mixture from said composition, a film having in the absence of an opacifying pigment a Kubelka-Munk scattering coefficient greater than 0.5 reciprocal mils at 440 angstroms and greater than 0.1 reciprocal mils at 5600 angstroms, and less than that which, upon removal of said solvent mixture from said composition produces a discontinuous film, and
(b) removing said solvent mixture from the film;
(c) curing said film to obtain a tough, mar resistant film.

19. A method as defined in claim 17 wherein said film forming, gelable polymer is prepared in said solvent mixture by polymerizing therein the corresponding monomers.

20. A method as defined in claim 17 wherein said composition contains a plurality of polymers.

21. A method as defined in claim 17 wherein said solvent mixture is removed by air drying.

22. A method as defined in claim 17 wherein said solvent mixture is removed by the use of a vacuum.

23. A substrate coated with a film produced by the method of claim 19.

24. A polymeric film comprising a continuous sheet containing a plurality of discrete closed cells, said cells having an average size below 1.0 micron and containing materials selected from the group consisting of pigments, fluorescent materials, optical brighteners and mixtures thereof which are soluble in the polymer, said film having in the absence of an opacifying pigment a Kubelka-Munk scattering coefficient greater than 0.5 reciprocal mils at 4400 angstroms and greater than 0.1 reciprocal mils at 5600 angstroms, said sheet comprising a rigid, cross linked, thermoset polymer.

25. An article coated with the film of claim 24.

References Cited

UNITED STATES PATENTS

| | | | |
|---|---|---|---|
| 3,450,650 | 6/1969 | Murata | 260—2.5 M |
| 3,486,946 | 12/1969 | Duddy | 260—2.5 M |
| 3,085,073 | 4/1963 | Lintner et al. | 260—2.5 B |

(Other references on following page)

UNITED STATES PATENTS

| | | | |
|---|---|---|---|
| 3,544,489 | 12/1970 | Dowbenko et al. | 260—2.5 M |
| 3,475,355 | 10/1969 | Decker | 260—2.5 M |
| 3,031,328 | 4/1962 | Larsen | 111—36.7 |
| 3,446,769 | 5/1969 | Opipari | 260—31.4 |

MURRAY TILLMAN, Primary Examiner

M. FOELAK, Assistant Examiner

U.S. Cl. X.R.

106—122, 130, 288, 308, 309; 117—36.1, 36.7, 37 R, 39, 64 R, 155 R, 155 L, 155 UA, 159, 161 K, 161 L, 161 LN, 161 UZ, 161 H, 161.2 B; 210—510; 260—2.5 R, 18 EP, 21, 31.2 R, 31.2 N, 31.4 R, 31.4 EP, 32.8 R, 32.8 EP, 32.8 N, 33.2 EP, 33.2 R; 33.4 EP, 33.4 R, 33.6 EP, 33.6 VA, 33.8 EP, 33.8 R, 33.8 UA, 37 R, 37 EP, 37 N, 39 R, 40 R, 41 R, 830 S, 830 P, 834, 850, 851, 856; 264—4, 41, 53, 344

UNITED STATES PATENT OFFICE
CERTIFICATE OF CORRECTION

Patent No. 3,661,807　　　　　　　　　　Dated May 9, 1972

Inventor(s) Jerome A. Seiner

It is certified that error appears in the above-identified patent and that said Letters Patent are hereby corrected as shown below:

Claim 1, line 17, "compound" should be -- composition --.

Signed and sealed this 12th day of December 1972.

(SEAL)
Attest:

EDWARD M. FLETCHER, JR.　　　　　　　ROBERT GOTTSCHALK
Attesting Officer　　　　　　　　　　Commissioner of Patents